(12) United States Patent
Johnson et al.

(10) Patent No.: US 7,985,270 B2
(45) Date of Patent: Jul. 26, 2011

(54) FLUID BED DRYER FILTERS

(75) Inventors: Joseph Johnson, Lancashire (GB); David Anthony Akerman, Manchester (GB)

(73) Assignee: Madison Filter 981 Ltd., Haslingden, Lancashire (GB)

( * ) Notice: Subject to any disclaimer, the term of this patent is extended or adjusted under 35 U.S.C. 154(b) by 81 days.

(21) Appl. No.: 12/088,960

(22) PCT Filed: Nov. 10, 2006

(86) PCT No.: PCT/GB2006/004190
§ 371 (c)(1),
(2), (4) Date: Aug. 4, 2008

(87) PCT Pub. No.: WO2007/054704
PCT Pub. Date: May 18, 2007

(65) Prior Publication Data
US 2009/0145094 A1 Jun. 11, 2009

(30) Foreign Application Priority Data
Nov. 10, 2005 (GB) .................................. 0522913.3

(51) Int. Cl.
*B01D 46/02* (2006.01)
(52) U.S. Cl. .............. 55/341.1; 55/378; 55/381; 55/484

(58) Field of Classification Search ............... 55/376, 55/341.1–341.7, 378, 381, 484
See application file for complete search history.

(56) References Cited

U.S. PATENT DOCUMENTS

| 2,930,446 A | * | 3/1960 | Momberg et al. ............... 55/356 |
| 3,937,621 A |   | 2/1976 | Gravley |
| 4,015,961 A | * | 4/1977 | Howard et al. ................. 55/378 |

FOREIGN PATENT DOCUMENTS

| GB | 1603110 | 11/1981 |
| WO | 9525580 | 9/1995 |
| WO | 9836819 | 8/1998 |

\* cited by examiner

*Primary Examiner* — Duane Smith
*Assistant Examiner* — Tiffany N Palmer
(74) *Attorney, Agent, or Firm* — Barlow, Josephs & Holmes, Ltd.

(57) ABSTRACT

A fluidised bed filter comprises a drying pan, and a filter assembly having a membrane over the pan, and a plurality of openings in the membrane. A filter bag is secured to each aperture by means of a clamping ring attached to the rim of the respective aperture, and cooperating with a clamping band within the cuff of the bag. The material of the bag is clamped between the ring and the band. The ring is covered in a cloth strip, which is folded over to produce a flap, which is stitched between the layers of a double fabric forming the membrane. The band is retained in a tunnel formed by a fold in a double fabric forming the filter bag by stitching.

13 Claims, 2 Drawing Sheets

FLUID BED DRYER FILTERS

This invention relates to improvements in fluid bed dryer filters.

Fluid bed dryers are used in the production of a wide range of industrial chemicals, for example production of pharmaceuticals or dye-stuffs. Essentially, a fluidised bed dryer consists of a large pan which is filled with wet particulate material. Warm air, the temperature of which can be closely regulated is blown into the bottom of the pan so that the particles become fluidised and behave like a fluid, attractive forces between the particles such as electrostatic or capillary water film bonding being broken down. The air acts to vaporise the water present in the wet material, and the air with entrained water vapour is drawn out from above the fluid bed through a fluid bed dryer filter, to separate entrained dust (largely derived from the solids fraction of the particulate material) from the exhausted air stream.

Structurally, known fluid bed dryer filters comprise a sheet extending over the fluidised bed, with apertures therein into which the dust laden air is drawn, the apertures opening into respective filter bags, which typically are extended upwardly above the sheet so that the air is drawn up into the bags, and out through the walls of the bag into a space above the filter under the action of an extractor. The dust is left behind as filter cake on the inside of the filter bags.

The process is usually run as a batch process, with the entire filter assembly being removed and replaced, for cleaning and recovery of the filter cake, between batches.

The filter bags or pockets may be suspended from hooks on a circular frame above the sheet, so that they are maintained extending upwardly even when air is not being drawn through them. Removal of accumulated dust from the interior surfaces of the pockets is not usually a problem as normal vibrations occurring during use are usually sufficient to dislodge "cake", but a special vibration step may be provided for at the end of each batch cycle, to ensure that as much dust as possible falls back into the pan.

In the prior art the filter bags or pockets are stitched to the sheet, and thus in the event of damage to any one of more of the bags, either a prolonged operation of unstitching and then sewing in a replacement is required perhaps involving return to the manufacturer, or for on site repair or positioning, or the whole filter assembly must be replaced.

The sewing of the pockets into a typical assembly, which may comprise from 10 to 30 pockets or bags, involves an intricate design and is a labour intensive operation. Each of the pockets is heavy and difficult to manipulate during manufacture, and the stitching of the diaphragm to the pockets distorts the diaphragm from a planar configuration, making installation onto the machine very difficult. The distortion also increases the risk that stitched seams may loosen and create dust entraining leaks. Also the directional importance of D-rings provided at the ends of the pockets means that the pockets have to be carefully aligned before stitching, which is time consuming particularly if errors have to be corrected.

It is an object of the invention to provide a fluid bed dryer filter which is so constructed that these problems with known filters of this kind can be overcome or ameliorated.

In accordance with the invention, a fluid bed dryer filter comprises a membrane having a plurality of openings therein, a respective filter bag/or pocket for attachment to the membrane so that each opening in the membrane admits to the interior of a filter bag or pocket, characterised in that each pocket is detachably attached to the membrane by means of a clamping device, and that the edge of each aperture in the membrane is formed to be stiff and shape-retaining.

Each filter bag or pocket may be in the form of a cylindrical pouch of a filter material, having an open end and a closed end. The clamping device may comprise a sealing band provided about the open end of the filter bag or pocket.

A suitable type of clamping band is disclosed in WO95/25580 (Scapa). This comprises a profiled resilient band which is joined to the open end (cuff) of a filter bag or sleeve, and is formed as a deformable sleeve with a groove, in which the edge of an aperture in for example a cell plate may be received.

In a preferred embodiment of the present invention, the edges of the apertures in the membrane may be given the necessary rigidity or firmness to engage with the bands in the filter bag cuffs by means of a hoop of metal or other rigid or sufficiently stiff material.

Each of the filter bags or pouches may be formed from a double layer of filter fabric, which is folded at the cuff edge, and the clamping band may be accommodated within the fold, between the layers of filter fabric. A sealing layer or gasket strip may advantageously be provided between the clamping band and the hoop on the edge of the aperture in the membrane. This may be placed over the clamping band and also be accommodated between the layers of the filter fabric within the fold, and may comprise a needle felt strip, or other suitable gasket material, to obtain a good seal.

The cuff region of the bag, surrounding the open end of the filter bag, may be stitched above the fold which encloses the clamping band, to keep the latter in position in the cuff, entering the fold.

The rigid hoop defining the edge of each aperture in the membrane may be retained by a strip of filter material wrapped about the hoop, stitched into the main part of the membrane, which may be a double filter fabric or be an air impervious material.

The clamping band may be an expansion ring, biased to expand outwardly to clamp against the ring. Conversely, the ring may be a constricting member, such as a ring of high density rubber, which tightens around the clamping band.

A preferred embodiment of fluid bed dryer filter according to the invention will now be described by way of example with reference to the accompanying drawings, wherein.

Figure 1:
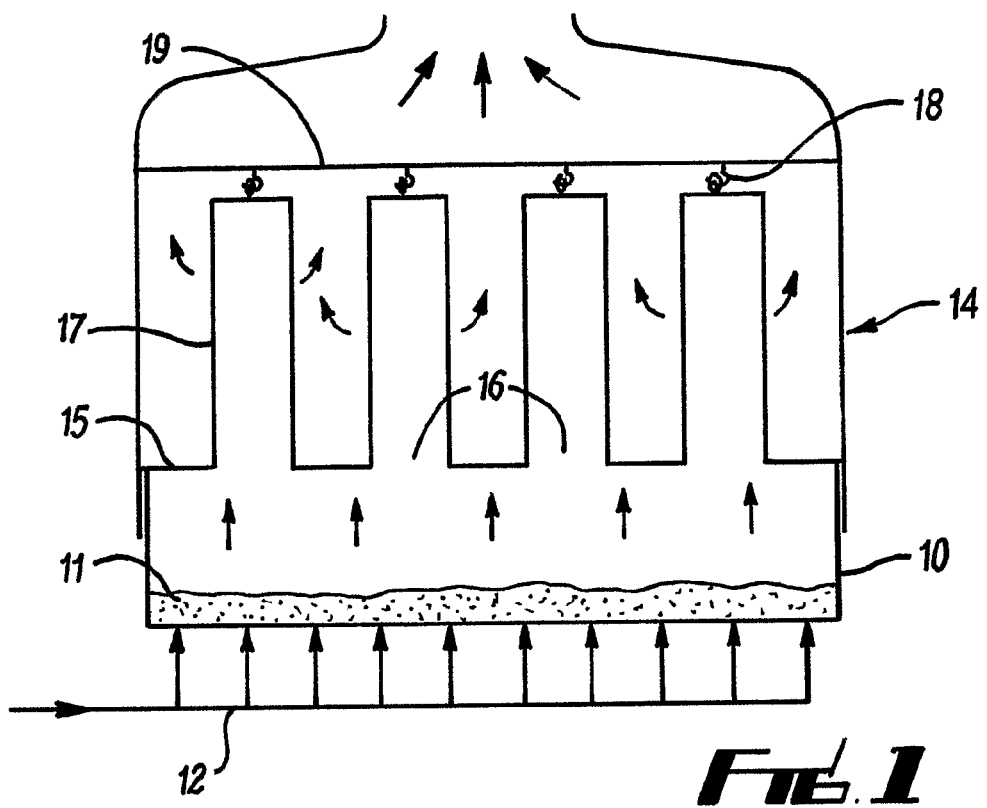
FIG. 1 is a general sectional view of a fluidised bed dryer with a filter according to the invention disposed over the fluidised bed.
Figure 2:
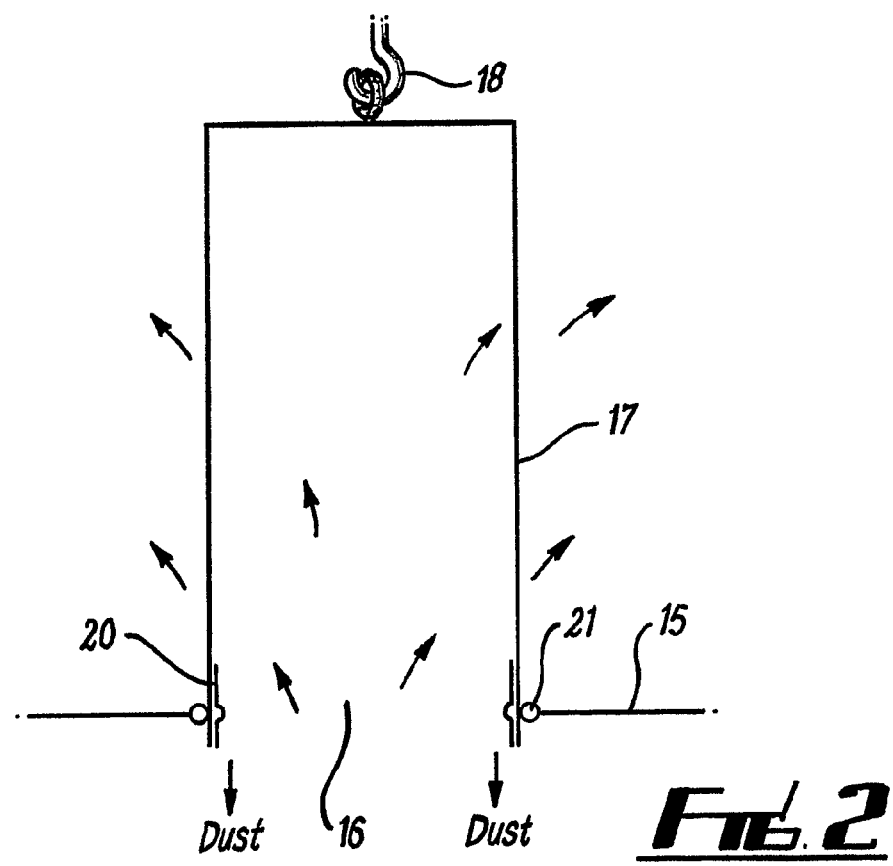
FIG. 2 is a diagrammatic cross-section of part of the filter according to the invention.

As shown in the diagram of FIG. 1, a fluidised bed dryer comprises a flat bottomed pan 10 having an extensive surface over which is spread a layer of damp powdered or granular material 11 to be dried. To dry the material 11, and to fluidise the same, by counteracting agglomerative tendencies such as electrostatic attraction or capillary adhesion due to particle surface water films, a supply of warm air is fed from below, by line 12 through a myriad of inlet apertures in the bottom of the pan.

This air both agitates and dries the particles of the powdered or granular material 11, and inevitably, particularly in the case of very finely divided materials, particles are entrained by the air current. This is the reason for provision of the filter assembly 14 disposed over the filter pan, so that entrained particles can be caught by the filter and prevented from escaping with the air stream.

The filter assembly 14 generally comprises a membrane 15, which may be impervious to air, or may be a sheet of a suitable filter fabric having a plurality of apertures 16 therein, which open into respective bag filters 17 in the form of cylindrical pockets of filter fabric, which are closed at the upper end.

The top ends of the bags 17 are suspended by hooks 18 from a frame 19, so that even when the air current is not flowing, the bags do not collapse, but remain in place.

In accordance with the invention, instead of the bags 17 being stitched or welded to the membrane 15, each bag is secured to the membrane by means of the interaction of clamping band 20 or sleeve at the open end of the bag, and a ring 21 of firm or rigid material defining the rim of the aperture 16.

Figure 3:
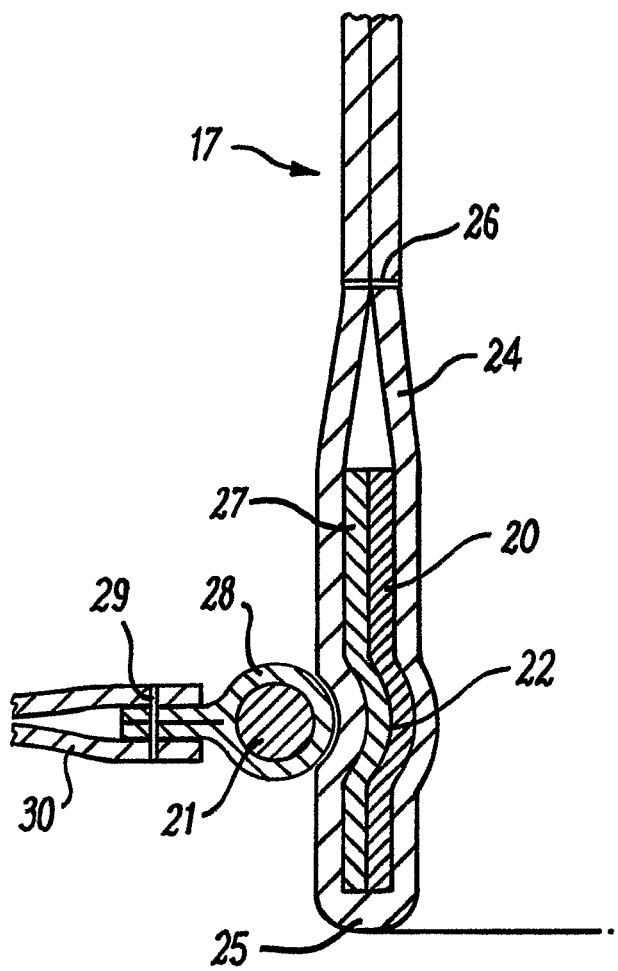
FIG. 3 is an enlarged detail cross-section of a part of the filter shown in FIG. 2.

As shown in detailed enlargement of FIG. 3, the clamping band 20 comprises a sleeve or ring of metal or a suitable synthetic material, which is profiled to present an outwardly facing depression or groove 22, which provides a seat for the ring 21.

The clamping band 20 may be as described in WO95/25580 or a modification thereof, and slotted to assist deformation.

The filter bag 17 is made from a double layer of filter cloth 24, folded back on itself at the open end of the filter bag 17, to form a cuff 25, and the clamping band 20 is retained between the superposed layers of filter cloth, in a cuff region delimited by stitching 26 which serves to ensure that the band 20 does not slip out of the cuff region. A strip 27 of a needle felt material is provided over the clamping band 20, within the cuff region and this serves to provide a seal and cushioning between the clamping band 20 and the ring 21 in the edge of the aperture 16.

The ring 21 is secured by being enclosed in a strip 28 of cloth which is folded about the ring 21 and the edges stitched together by stitching 29 which at the same time secures the edges of the strip 29 between the layers of a double layer fabric 30 forming the membrane 15.

The fabric 30 may be a filter fabric, similar to that of the filter bags 17, or be an air impermeable diaphragm.

Figure 4:
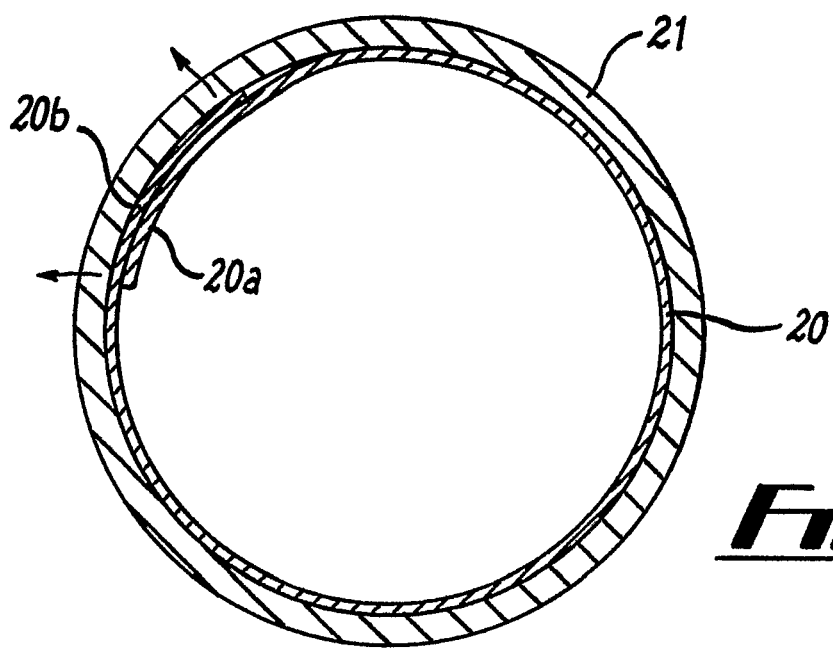
FIG. 4 illustrates a variant clamping ring for use in the filter bag of FIG. 2.

The clamping band 20 may as shown in FIG. 4 comprises a resilient member which is biased to expand outwardly having over lapped ends 20a, 20b thereby pressing the band 20 with the strip 27 outwardly against the ring 21 in the edge of the aperture, or alternatively the ring 21 may be made of a firm rubber or rubber substitute material which is biased to contract and thereby exert clamping and sealing pressure on the band 20 in the cuff region of each filter bag 17.

The construction described has advantages with respect to known fluid bed dryer filters, in that the individual filter bags 17 are each separately removable for replacement or repair from the filter assembly, and this can be done on site. The time consuming operation of stitching each of up to 30 filter bags to the membrane sheet is avoided, as is the risk of distortion of the sheet if stitching is earned out incorrectly. Any distortion arising from securing the rings 21 to the edge of the fabric around the apertures 16 is accommodated by the securing strip 28.

Modifications and variations may be made to the apparatus within the scope of the invention, particularly with regard to the number and dimensions of filter bags or pockets, the types and specifications of filter cloths used, and the material used for the band 20 and ring 21 which may be metal, rubber or synthetic rubber, or suitable synthetic plastics materials. It is also possible that the clamping arrangement is reversed, that is, a hoop similar to ring 21 is disposed in the cuff end region of the filter bag, whilst a resilient clamping band similar to band 20 is attached to the diaphragm. In this case, the band would most probably be adapted to press inwardly on the hoop, that is constrict, thereby effecting the required clamping action.

The invention claimed is:

1. A fluid bed drier filter comprising
    a fabric membrane having one or more openings therein,
    one or more respective filter bags for attachment to the membrane so that each opening in the membrane admits to the interior of a respective filter bag,
    wherein edges of the one or more openings in the membrane are given rigidity or firmness to engage with open ends of the one or more filter bags by means of a hoop of metal or other rigid or stiff material,
    wherein each of the one or more filter bags is detachably attached to the membrane by means of a respective clamping device, and
    further wherein each respective clamping device comprises a profiled resilient band which is joined to the open end of a filter bag, and is formed as a deformable sleeve with a groove,
    each respective clamping device further comprising a stiff, shape-retaining member,
    whereby by means of an interaction between the resilient band and the stiff, shape-retaining member, the open end of each filter bag is secured to an opening in the membrane.

2. A filter according to claim 1, wherein each filter bag is in the form of a cylindrical pouch of a filter material, having an open and a dosed end.

3. A filter according to claim 1, wherein each filter bag is formed from a double layer of filter fabric which is folded at the open end or cuff edge.

4. A filter according to claim 1, wherein the sealing band is accommodated within the fold, between the layers of filter fabric.

5. A filter according to claim 1, wherein a sealing layer or gasket strip is provided between the clamping band and the hoop on the edge of the opening in the membrane.

6. A filter according to claim 5, wherein the sealing layer or gasket strip is placed over the clamping band and accommodated between the layers of the filter fabric, within the fold, and comprises a needlefelt strip.

7. A filter according to claim 4, wherein the cuff region of the bag, surrounding the open end of the filter bag, is stitched above the fold enclosing the clamping band.

8. A filter according to claim 1, wherein the rigid hoop defining the edge of each opening in the membrane is retained by a strip of filter material stitched into the main part of the membrane.

9. A filter according to claim 1, wherein the membrane comprises a double filter fabric, or an air impervious material.

10. A filter according to claim 1, wherein the clamping device comprises an expansion ring, biased to expand outwardly to clamp against the rigid hoop.

11. A filter according to claim 1, wherein the clamping device comprises a constricting ring, which tightens around the rigid hoop.

12. A filter according to claim 1, wherein each filter bag or pouch is formed from a double layer of filter fabric which is folded at the open end or cuff edge.

13. A filter according to claim 12, wherein the sealing band is accommodated within the fold, between the layers of filter fabric.

* * * * *